Sept. 27, 1955  A. A. PRISCHMANN  2,718,746
SWATH LIFT PICK-UP CARRIER
Filed Jan. 3, 1952  2 Sheets-Sheet 1

Arnold A. Prischmann
INVENTOR.

BY *Clarence A. O'Brien*
*and Harvey B. Jacobson*
Attorneys

Sept. 27, 1955  A. A. PRISCHMANN  2,718,746
SWATH LIFT PICK-UP CARRIER
Filed Jan. 3, 1952  2 Sheets-Sheet 2

Arnold A. Prischmann
INVENTOR.

BY Clarence A. O'Brien
and Harvey B. Jackson
Attorneys

United States Patent Office 2,718,746
Patented Sept. 27, 1955

2,718,746
SWATH LIFT PICK-UP CARRIER
Arnold A. Prischmann, Casselton, N. Dak.
Application January 3, 1952, Serial No. 264,757
10 Claims. (Cl. 56—372)

This invention relates generally to a swath lift pick-up carrier, and more particularly to a carrier or carriage adapted to have mounted thereon a combine pick-up attachment.

The primary object of this invention is to provide an improved carriage in which may be mounted a conventional combine pick-up attachment in such a manner that it may be utilized to pick up swaths of grain and turn same over.

Another object of this invention is to provide an improved carriage having a triangular frame construction so that the carriage may be attached to a conventional drawbar of a tractor and at the same time having a major portion thereof extending outwardly of the rear wheels of the tractor.

Another object of this invention is to provide an improved carriage for mounting a conventional combine pick-up attachment, said carriage having drive means powered by one of its ground engaging wheels for driving said pick-up attachment.

Another object of this invention is to provide an improved carriage for mounting a combine pick-up attachment, said carriage having an axle extending transversely of the rear portion thereof with said axle having means thereon for mounting the combine pick-up attachment.

A further object of this invention is to provide an improved carriage for mounting a conventional combine pick-up attachment, said carriage having means for adjustably mounting said attachment in such a manner that its lifting fingers may be positioned closely adjacent the ground.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 2:
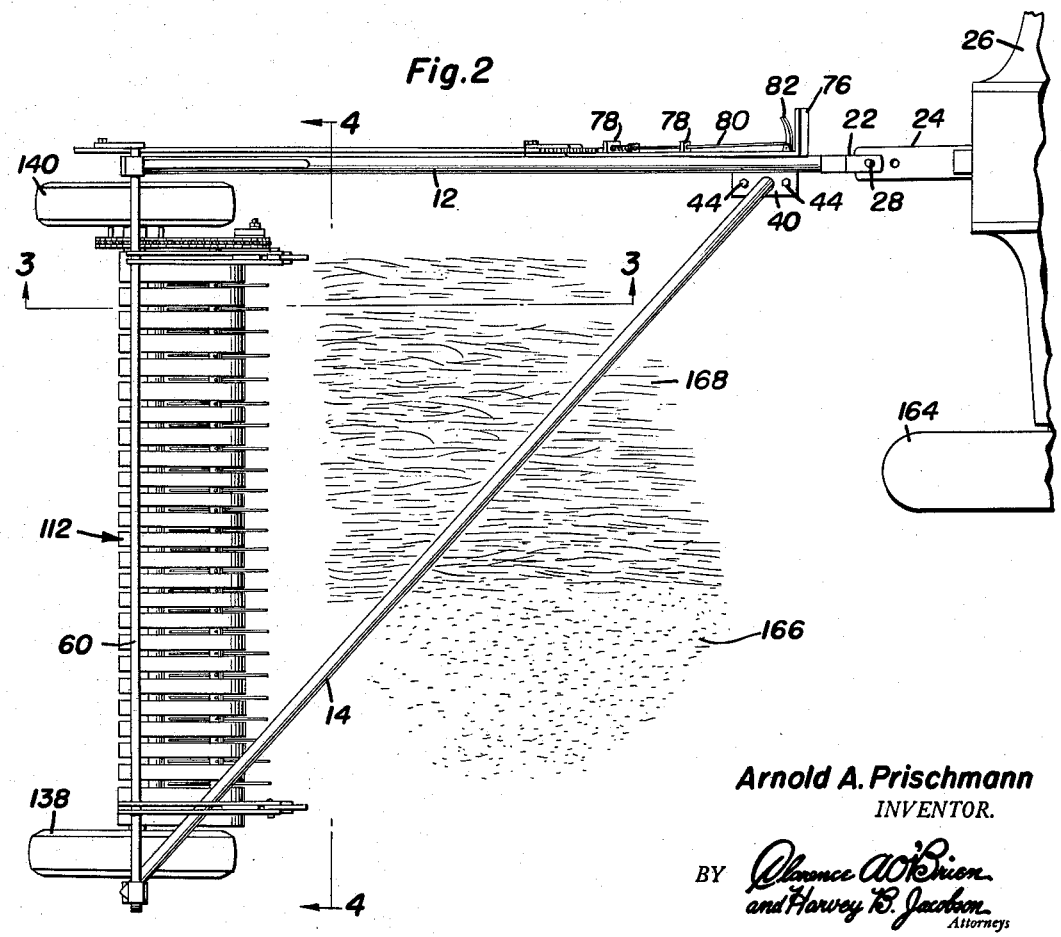
Figure 2 is a top plan view of the carriage of Figure 1 and shows the position of the carriage with respect to its towing tractor.
Figure 4:
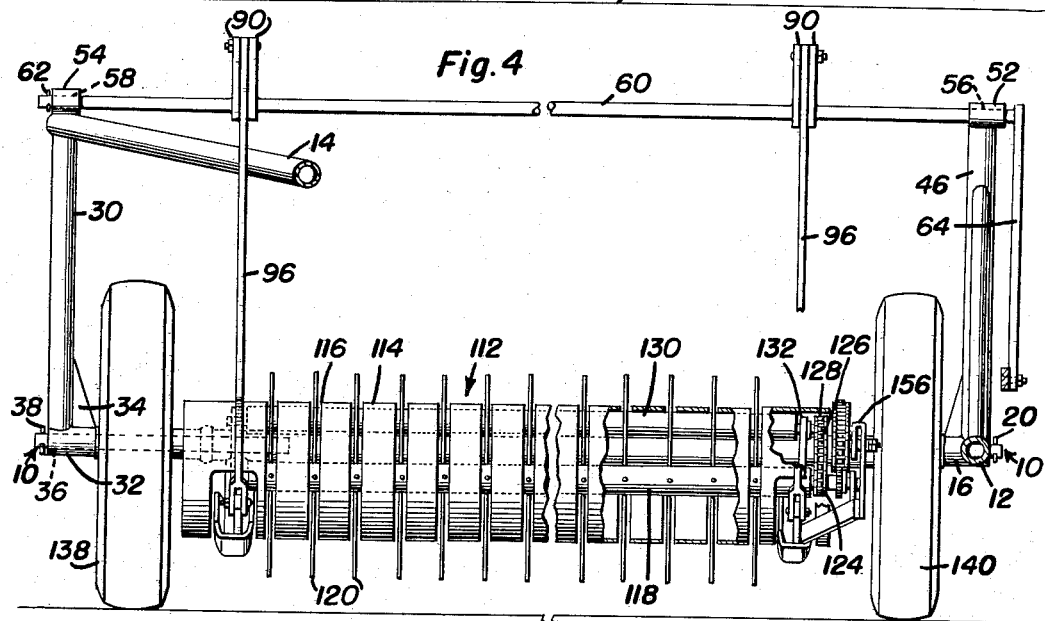
Figure 5:
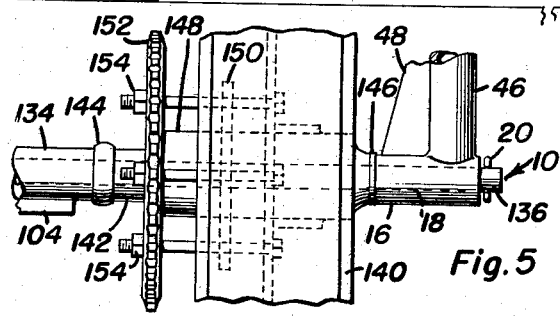

Figure 4 is an enlarged transverse vertical sectional view taken substantially on the plane indicated by the section line 4—4 of Figure 2, the central portion being omitted and the other parts being broken away and shown in section in order to more clearly show the construction of the pick-up attachment; and Figure 5 is an enlarged fragmentary view showing the manner in which a drive gear is attached to one of the ground engaging wheels of the carriage.

Similar characters of reference designate similar or identical elements and portions throughout the specification and throughout the different views of the drawings.

Referring now to the drawings in detail, it will be seen that the carriage, which is the subject of this invention, includes a transversely extending axle member 10, a forwardly extending longitudinal frame member 12 and a diagonal frame member 14.

The longitudinal frame member 12 has welded at its rear end a journal member 16 having a transversely extending bore 18 in which is rotatably received one extreme end of the axle member 10. The journal portion 16 of the longitudinal frame member 12 is retained on the axle member 10 by a conventional cotter pin 20. The forward end of the longitudinal frame member 12 is provided with a conventional hitch 22 which is pivotally connected to a drawbar 24 of a conventional tractor 26 by a draw pin 28.

Figure 1:
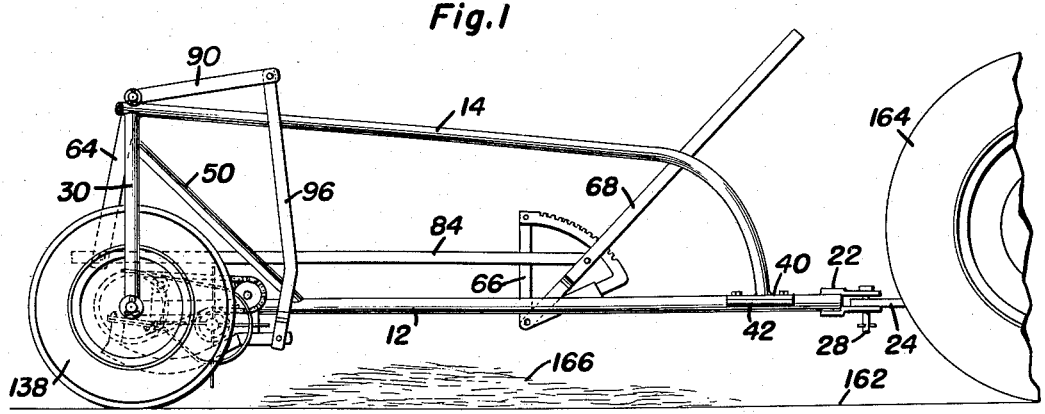
Figure 1 is a side elevational view of the carriage, which is the subject of this invention, and showing a conventional combine pick-up attachment mounted thereon, the forward end of the carriage being illustrated as being hitched to the drawbar of a conventional tractor, only the rear portion of the tractor being illustrated.

As is best illustrated in Figures 1 and 4, the diagonal frame member 14 includes a vertical standard 30 at its rear end, the vertical standard having a journal portion 32 welded at its lower end. The journal portion 32 is braced with respect to the standard 30 by a triangular gusset plate 34. The journal portion 32 also has a transversely extending bore 36 in which is rotatably mounted the other end of the axle member 10. The journal portion 32 is retained on the end of the axle member 10 by a conventional cotter pin 38.

The forward end of the diagonal frame member 14 is curved forwardly and downwardly and terminates in an attaching plate 40 welded to the end thereof. The attaching plate 40 overlies a mounting plate 42 welded to the inner side of the longitudinal frame member 12 at a point adjacent its forward end. The attaching plate 40 is secured to the mounting plate 42 by a plurality of fasteners 44.

Figure 3:
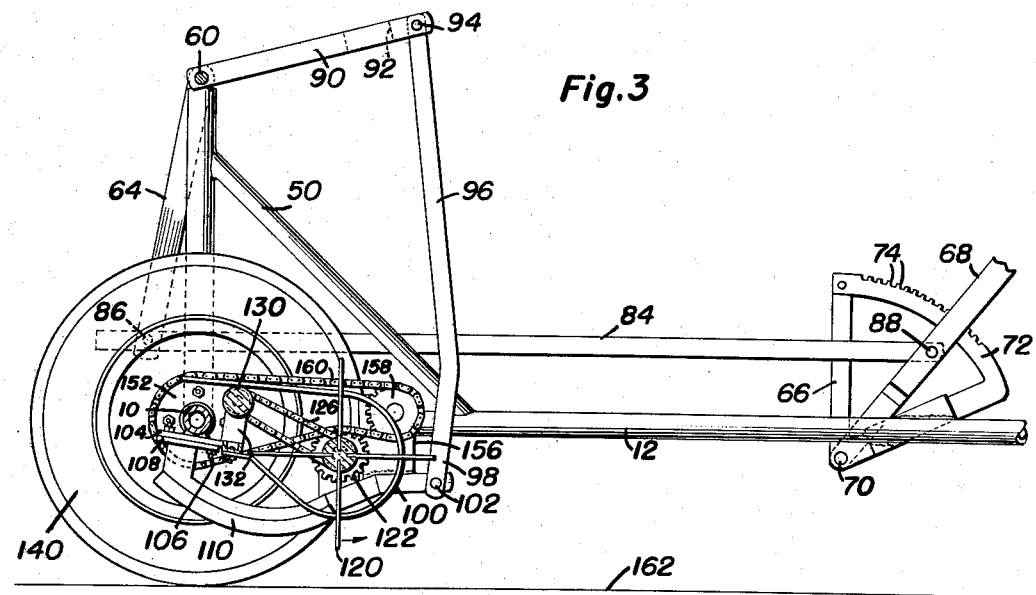
Figure 3 is an enlarged partial transverse vertical sectional view taken substantially on the plane indicated by the section line 3—3 of Figure 2 and showing the specific drive means for the combine pick-up attachment.

Referring now to Figures 3 and 4 in particular, it will be seen that the journal portion 16 of the longitudinal frame member 12 has welded to its upper side a standard 46 whose upper end is at the same elevation as the upper rear end of the diagonal frame member 14. The standard 46 is braced by a triangular gusset plate 48 secured to the journal portion 16, and by a diagonal base member 50 welded to the standard adjacent its upper end and to the longitudinal frame member 12.

Welded to the upper ends of the standard 46 and the rear portion of the diagonal frame member 14 are journals 52 and 54, respectively. The journals 52 and 54 have aligned bores 56 and 58, respectively, therein. Rotatably journaled in the bores 56 and 58 is a transversely extending rod 60 having its ends extending through the journals 52 and 54. The rod 60 is retained within the journal 54 by a conventional cotter pin 62, and has its end portion which extends through the journal 52 provided with a crank arm 64.

Referring now to Figure 3 particularly, it will be seen that rigidly welded to the other side of the longitudinal frame member 12 intermediate its ends is a substantially triangular mounting bracket 66. One of the apices of the triangular mounting bracket 66 is disposed slightly below the frame member 12 and has pivotally secured thereto an operating lever 68 which pivots about a pivot pin 70. The side of the mounting bracket 66 opposite the apex to which the operating arm 68 is attached is in the form of a sector rack 72 having a plurality of teeth 74 on its upper and outer edge.

Referring now to Figure 2, it will be seen that the operating lever 68 is provided at its upper end with an outwardly turned handle portion 76 for rotating same about the pivot pin 70. Carried by the other side of the operating lever 68 are spaced brackets 78 in which are slidably mounted a locking rod 80 having a handle 82 at its upper end. The lower end of the locking rod 80 is intended to be disposed between adjacent teeth 74 of the sector rod 72 in order to maintain the operating lever 68 in an adjusted position.

Referring again to Figure 3, it will be seen that the operating lever 68 is connected to the lower end of the crank arm 64 by an elongated link 84. The link 84 is pivotally secured to the crank arm 64 and the operating lever 68 by pivot pins 86 and 88 respectively. Rigidly secured to the rod 60 intermediate its ends are pairs of spaced arms 90, each pair of arms 90 having their outer ends spaced by a spacer 92 welded therebetween adjacent their outer ends. Secured to the outer ends of each pair of arms 90 in pivotal relation thereto by a pivot pin 94 is a substantially vertical link 96 which is provided with a bifurcated lower end 98. Pivotally secured to the bifurcated end 98 of the link 96 is an attaching arm 100 which will be described in more detail hereinafter. The attaching arm 100 pivots about a pivot pin 102 carried by the bifurcated end 98.

As is best illustrated in Figure 3, there is attached to the underside of the axle member 10 a pair of spaced mounting plates 104. Secured to the mounting plate 104 by conventional fasteners 106 is an attaching plate 108 carried by a frame member 110 of a conventional combine pick-up attachment which will be referred to by the reference numeral 112. The forward end of the frame member 110 is rigidly bolted to the attaching arm 100. It will be understood that the pick-up attachment 112 is provided with two such frame members 110, one at each end of the attachment.

The combine pick-up attachment 112 is provided with a conventional housing 114 which is segmental and has a plurality of spaced parallel slots 116 therein. Rotatably mounted within the housing 114 is a shaft 118 which has mounted thereon a plurality of spring fingers 120. The spring fingers 120 rotate within the spaced parallel slots 116 and extend beyond the housing 114. Carried at one end of the shaft 118 is a gear 122 also carried by the shaft 118 is a smaller drive gear 124 which is connected by a chain 126 to a gear 128 carried on the end of the shaft of a roller member 130. The roller member 130 is mounted upon brackets 132 carried by the housing 114. The roller member 130 is positioned rearwardly of the path of the spring fingers 120 and closely underlies the upper portion of the housing 114. The above mentioned elements of the combine pick-up attachment are elements of a conventional pick-up attachment now on the market and is in no way a part of this invention.

Referring now to Figure 5 in particular, it will be seen that the axle member 10 is formed of a central axle portion 134 having smaller stub axles 136 extending from the ends thereof. Rotatably mounted on the stub axles 136 are wheels 138 and 140. The wheel 140 is disposed on the end of the axle member 10 adjacent the drive means for the combine pick-up attachment 112 and is provided with a hub 142. The hub 142 engages a thrust washer 144 disposed on the stub axle 136 and engaging the end of the central axle portion 134. The outer end of the hub 142 is in engagement with a thrust washer 146 which bears against the housing portion 16 of the longitudinal frame member 12. It will be noted that the hub 142 has an enlarged central portion 148 to which is welded the web of the wheel 140 and a mounting plate 150. Received over the inner portion of the hub 142 and engaging against the shoulder formed by the enlarged central portion of the hub 148 is a drive gear 152. The drive gear 152 is maintained on the hub 142 by a plurality of elongated bolts 154 which pass through the web of the wheel 140, the mounting plate 150 and the drive gear 152.

The wheel 138 is similar to the wheel 140 with the exception that its hub does not have an enlarged central portion on which is mounted a drive gear. However, the wheel 138, since it does not drive any mechanism, may be of any conventional design.

Referring now to Figures 3 and 4, it will be seen that carried by the combine pick-up attachment 112 adjacent the wheel 140 is a mounting bracket 156. Rotatably mounted on the mounting bracket 156 is an idler gear 158. Extending between and around the drive gear 152 and of the idler gear 158 is a chain 160. The chain 160 also passes over the gear 122 of the shaft 118 in order to rotate same upon rotation of the wheel 140. The idler gear 158 is mounted on the bracket 156 for sliding movement with respect thereto in order to tightly engage the chain 160 with the upper portion of the gear 122. It will be seen that when the wheel 140 moves forwardly and rotates in a clockwise direction, that the gear 122 and its associated shaft 118 rotate in a counter-clockwise direction.

The height of the spring fingers 120 from the ground 162 may be varied by raising the height of the forward end of the frame members 110. This is accomplished by pivoting the operating lever 68 which in turn rotates the rod 60 through the link 84 and the crank arm 64. As is clearly illustrated in Figure 3, when the rod 60 rotates clockwise the lower ends of the frame members 110 are dropped, and when the rod 60 is rotated counter-clockwise the forward lower end of the frame members 110 are raised.

Referring now to Figure 2, it will be seen that the combine pick-up attachment 112 is mounted in the carriage in such a manner that it extends outwardly of the rear wheel 164 of the tractor 26. In operation, the tractor 26 is driven inwardly, or to the left of (as viewed in Figure 2) a swath of grain 166 and over stubble 168. The swath of grain 166 is engaged by the rotating spring fingers 120 of the combine pick-up attachment 112, and is picked up by the fingers. The swath of grain 166 is then deposited on the top of the housing 114 of the combine pick-up attachment 112, and moved rearwardly thereon and off the rear thereof by additional grain being deposited thereon by the spring fingers 120. The rearward movement of the swath of grain 166 is further aided by the rotating roller 130 which closely underlies the upper surface of the housing 114. The spring fingers 120 at the same time engage the stubble 168 and straightens same. The swath of grain 166 having been fluffed and aerated, is deposited upon the straightened stubble 168 with an air space between the swath and the ground. This procedure accelerates the drying of the swath, assists in preventing loss of grain through dampness, and prevents growth of the swath by removing the swath from contact with the ground.

In view of the foregoing, it is believed that the operation of the carriage in combination with the combine pick-up attachment will be readily understood and further description is unnecessary. Minor modification of the carriage, varying in minor details from the embodiment of the carriage illustrated and described here, may be resorted to without departure from the spirit and scope of this invention, as defined in the appended claims.

Having described the invention, what is claimed as new is:

1. A machine for treating a windrow comprising a wheeled carriage adapted to be drawn along said windrow, a combine pick-up attachment mounted on said wheeled carriage, means for driving said pick-up attachment, said wheeled carriage having a triangular frame formed by an axle member, a longitudinal frame member secured to one end of said axle member at right angles thereto and extending forwardly therefrom, and a diagonal frame member secured at one end to the opposite end of the axle member and at the other end to said longitudinal frame member, the connections between said frame members and said axle member being pivotal.

2. A machine for treating a windrow comprising a wheeled carriage adapted to be drawn along said windrow, a combine pick-up attachment mounted on said wheeled carriage, means for driving said pick-up attachment, said wheeled carriage having a triangular frame formed by an axle member, a longitudinal frame member pivotally secured to one end of said axle member at right angles thereto and extending forwardly therefrom, and a diagonal frame member pivotally secured at one end to the opposite end of the axle member and at the other end to said longitudinal frame member, said pick-up attachment being rigidly secured to said axle member at its rear edge, the forward edge of the pick-up attachment being supported in adjustable relation with respect to said axle member.

3. A machine for treating a windrow comprising a wheeled carriage adapted to be drawn along said windrow, a combine pick-up attachment mounted on said wheeled carriage, means for driving said pick-up attachment, said wheeled carriage having a triangular frame formed by an axle member, a longitudinal frame member pivotally secured to one end of said axle member at right angles thereto and extending forwardly therefrom, and a diagonal frame member pivotally secured at one end to the opposite end of the axle member and at the other end to said longitudinal frame member, said pick-up attachment being rigidly secured to said axle member at its rear edge, a standard carried by said longitudinal frame member at its connection with said axle member, a rod extending between the standard and the rear portion of said diagonal frame and rotatably secured thereto, linkage connecting said rod to the forward end of said pick-up attachment for raising and lowering upon rotation of said rod.

4. The machine of claim 3 wherein said rod is selectively rotated by shifting means carried by said longitudinal frame member.

5. A carriage comprising an axle member, wheels rotatably carried by said axle member adjacent the ends thereof, a longitudinal frame member carried by one end of said axle member exteriorly of one of said wheels, a diagonal frame member extending from the other end of said axle member exteriorly of the other wheel to the forward end of said longitudinal frame member, hitch means at the forward end of said longitudinal frame member, the connections between said frame members and said axle member being pivotal whereby the forward end of the longitudinal frame member may be raised and lowered without corresponding rotation of said axle member.

6. A carriage comprising an axle member, wheels rotatably carried by said axle member adjacent the ends thereof, a longitudinal frame member pivotally carried by one end of said axle member exteriorly of one of said wheels, a diagonal frame member pivotally connected to and extending from the other end of said axle member exteriorly of the other wheel to the forward end of said longitudinal frame member, hitch means at the forward end of said longitudinal frame member, said axle member having rigidly secured thereto a pair of mounting plates adjacent the inner sides of said wheels, a rod extending transversely of the rear of the carriage and rotatably carried by said frame members, linkage extending forwardly and downwardly from said rod, said linkage including support arms adapted to cooperate with said mounting plate for supporting mechanism within said carriage.

7. The carriage of claim 6 wherein said supports are vertically adjustable with respect to said mounting plates.

8. A machine for treating a windrow comprising a carriage adapted to be drawn along said windrow, a combine pick-up attachment mounted on said carriage, means for driving said pickup attachment, said carriage including an axle member, wheels rotatably carried by said axle member adjacent the ends thereof, a longitudinal frame member carried by one end of said axle member exteriorly of one of said wheels, a diagonal frame member extending from the other end of said axle member exteriorly of the other wheel to the forward end of said longitudinal frame member, hitch means at the forward end of said longitudinal frame member, the connections between said frame members and said axle member being pivotal whereby the forward end of the longitudinal frame member may be raised and lowered without corresponding rotation of said axle member, said combine pickup attachment being supported by said axle member.

9. A carriage comprising an axle member, wheels carried by said axle member adjacent the ends thereof, a longitudinal frame member carried by one end of said axle member exteriorly of one of said wheels, a diagonal frame member extending from the other end of said axle member exteriorly of the other wheel to the forward end of said longitudinal frame member, said axle member having rigidly secured thereto a pair of mounting plates adjacent the inner sides of said wheels, a rod extending transversely of the rear of the carriage and rotatably carried by said frame members, linkage extending forwardly and downwardly from said rod, said linkage including support arms adapted to cooperate with said mounting plate for supporting mechanism within said carriage.

10. A carriage comprising an elongated axle member, wheels rotatably carried by said axle member adjacent ends thereof, a longitudinal frame member pivotally carried by one end of said axle member exteriorly of one of said wheels, a diagonal frame member extending from the other end of said axle member exteriorly of the other of said wheels to the forward end of said longitudinal frame member, said diagonal frame member being rigidly secured to said longitudinal frame member and pivotally connected to said axle member, said axle member having rigidly secured thereto a pair of mounting plates adjacent the inner sides of said wheels, a rod extending transversely of the rear of the carriage and rotatably carried by said frame members, linkage extending forwardly and downwardly from said rod, said linkage including support arms adapted to cooperate with said mounting plate for supporting mechanism within said carriage.

References Cited in the file of this patent

UNITED STATES PATENTS

| | | |
|---|---|---|
| 2,472,260 | Morrill | June 7, 1949 |
| 2,502,599 | Smart | Apr. 4, 1950 |
| 2,525,506 | Wiedman | Oct. 10, 1950 |
| 2,529,422 | Sampson | Nov. 7, 1950 |
| 2,559,862 | Ferguson | July 10, 1951 |
| 2,596,902 | Krause | May 13, 1952 |